United States Patent
Burkett et al.

[15] 3,659,170
[45] Apr. 25, 1972

[54] DIRECT COUPLED POWER SOURCES AND BRAKING MEANS FOR TOOLS SUCH AS LAWN MOWERS

[72] Inventors: Wilford B. Burkett, Pacific Palisades; Robert V. Jackson, Los Angeles, both of Calif.

[73] Assignee: McCulloch Corporation, Los Angeles, Calif.

[22] Filed: Dec. 13, 1968

[21] Appl. No.: 787,295

Related U.S. Application Data

[63] Continuation-in-part of Ser. No. 655,593, July 24, 1967, abandoned.

[52] U.S. Cl............................................318/372, 310/77
[51] Int. Cl............................................................H02r 3/04
[58] Field of Search.................318/246, 247, 251, 370–372, 318/375; 310/50, 77

[56] References Cited

UNITED STATES PATENTS

| | | | |
|---|---|---|---|
| 2,536,491 | 1/1951 | Chapman et al. | 310/77 |
| 3,185,876 | 5/1965 | Broziat | 310/77 |
| 3,525,912 | 8/1970 | Wallin | 318/17 |
| 3,038,109 | 6/1962 | Mowery et al. | 318/209 |
| 2,482,453 | 9/1949 | Ankenman | 318/246 |
| 2,898,956 | 8/1959 | Zern | 310/77 |
| 2,560,000 | 7/1951 | Sacchini | 318/251 |
| 2,629,849 | 2/1953 | Barnes | 318/246 |
| 3,174,064 | 3/1965 | Muller | 310/77 |
| 3,277,357 | 10/1966 | Willis | 318/372 |
| 3,265,950 | 8/1966 | Modiano | 318/375 |

*Primary Examiner*—Bernard A. Gilheany
*Assistant Examiner*—W. F. Duncanson, Jr.
*Attorney*—Christie, Parker & Hale

[57] ABSTRACT

A direct-current motor operating at a speed which is safe for a specified tool is directly coupled to the working element of the tool and a brake cooperates with the motor to stop the movement of the working element within a prescribed time after removal of power from the motor.

19 Claims, 8 Drawing Figures

Patented April 25, 1972

INVENTORS.
WILFORD B. BURKETT
BY ROBERT V. JACKSON

Christie, Parker & Hale
ATTORNEYS.

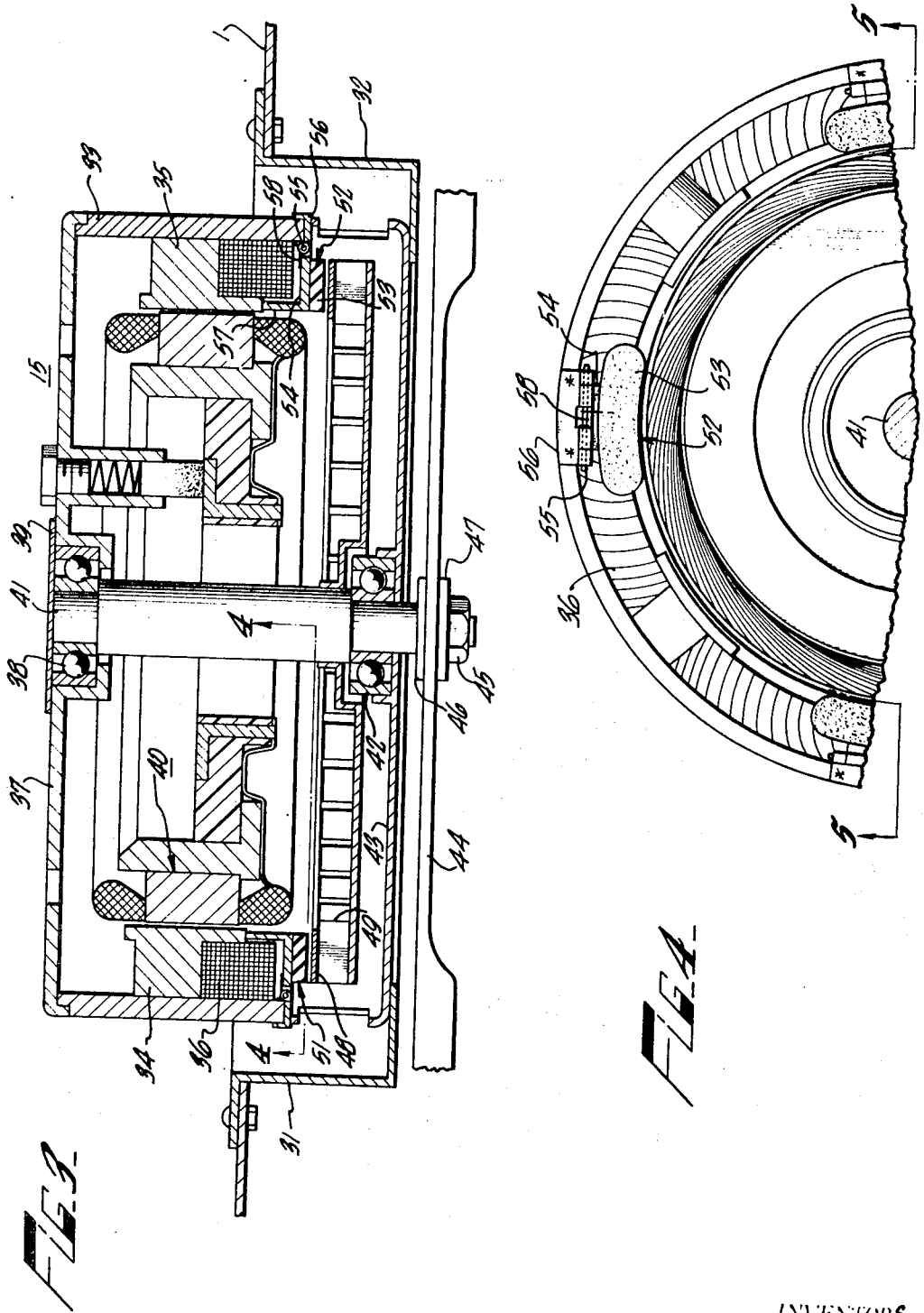

Patented April 25, 1972

INVENTORS.
WILFORD B. BURKETT
BY ROBERT V. JACKSON
Christie, Parker & Hale
ATTORNEYS Patented April 25, 1972

INVENTORS.
WILFRED B. BURKETT
ROBERT V. JACKSON

BY Christie, Parker & Hale
ATTORNEYS.

3,659,170

DIRECT COUPLED POWER SOURCES AND BRAKING MEANS FOR TOOLS SUCH AS LAWN MOWERS

CROSS-REFERENCES TO RELATED APPLICATIONS

This application is a continuation-in-part of application Ser. No. 655,593, filed July 24, 1967 now abandoned, by Wilford B. Burkett and Robert V. Jackson, entitled Direct Coupled Power Sources and Braking Means for Tools, such as Lawn Mowers, and assigned to the same assignee as the present application.

BACKGROUND OF THE INVENTION

This invention relates to power-driven devices, and more particularly to the system for supplying power to the power-driven devices and for stopping the working element within a prescribed time after the removal of power.

Many tools are now driven by electric motors and gasoline engines. For example, the working element or cutters of lawn mowers are driven by gasoline engines and alternating-current motors. Similarly, chain saws are commonly driven by gasoline engines or alternating-current motors. These alternating-current motors that are used to drive the working element of the tool generally operate at a speed in excess of 12,000 rpm. Because of the high speed of operation the motors cannot be directly coupled to the working element and therefore must be connected through some speed-reduction device, such as a gear train or pulley and belt arrangement. The speed reduction is required because of the safety requirements on many of these tools. For example, the maximum speed permitted at the tip of the rotary blade of a lawn mower is 21,000 feet per minute which maximum speed has recently been reduced to 19,000 feet per minute. If the rotary blade is a single 18 inch blade rotating about its midpoint, then the maximum speed of the shaft driving the blade, to be within the present safety requirements of 19,000 feet per minute, is approximately 4030 rpm. Thus, the alternating-current motor which operates at a speed in excess of 12,000 rpm must be coupled to the working element, such as a rotary blade for a lawn mower, through some speed-reduction device. However, these speed-reduction devices require periodic maintenance or replacement, and are, therefore, objectionable for being both a nuisance and costly. Additionally, the speed-reduction devices are generally quite noisy. Not only are the speed-reduction devices noisy but the alternating-current motor operating at a speed in excess of 12,000 rpm gives off a high-pitched whine which can be heard for a great distance, and is thus also irritating to any people in the surrounding neighborhood.

SUMMARY OF THE INVENTION

To overcome the irritating whine and noise of the high speed alternating-current motor power sources, the noise of speed-reduction devices, and the maintenance requirements of the speed-reduction devices, a direct-current motor is employed in accordance with the present invention and is directly coupled to the working element, e.g., the cutting blade of a rotary lawn mower or the saw chain of a chain saw. Thereafter, the direct-current motor is operated at a speed compatible with the safety requirements of the device so that expensive and noisy speed-reduction devices are not required.

Furthermore, the additional safety requirement that exists with many devices, which is that the working element must come to a complete stop within a prescribed time after the removal of power, is also economically and simply provided for by the present invention. An example of this additional safety requirement is found in connection with power-driven lawn mowers wherein the blade of the lawn mower must come to a complete stop within 10 seconds after the power is disconnected or turned off. In accordance with the present invention the working element of the device driven by a direct-current motor is stopped in the prescribed period of time established by the safety requirements for the particular power-driven tool, by employing a friction brake or a dynamic brake in conjunction with the motor that is directly coupled to the working element.

Dynamic braking is economically and simply provided in accordance with this invention by connecting the motor, upon the removal of power from the motor, as a short-circuited generator with a reversed field.

An alternative, simple and inexpensive brake is the friction brake in accordance with the present invention. This type of braking means is simply and economically provided by employing a disc mechanically coupled to the rotor of the motor and extending over the pole shoes of the stator and one or more magnetically responsive brake shoes magnetically coupled to at least one field pole shoe and positioned to cooperate with the disc to form a friction brake upon the removal of power from the motor.

A particularly advantageous type of friction brake comprises a disc coupled to the armature either directly or through an element, such as a fan, and a cooperating ring positioned inside the motor housing over the pole shoes. The ring has depending metal tabs that cooperate with an associated field pole shoe to enhance the magnetic attraction to hold the ring away from the cooperating disc while power is being applied to the motor. The ring is held in place by a plurality of spring loaded lugs, with the springs forcing the ring against the disc when power is removed. Additionally, either the ring or disc may have a friction material attached to the side nearest the other element to further increase the braking effect.

BRIEF DESCRIPTION OF THE DRAWING

The above and other features of the present invention will be understood more clearly and fully upon consideration of the following specification and drawings, in which:

FIG. 3 is a cutaway view taken along the section lines 3—3 of FIG. 1 of the direct-current motor directly coupled to the working element of the representative power-driven tool, in accordance with the present invention;

FIG. 4 is a view of one-half of the stator and rotor of the motor taken along the section line 4—4 of FIG. 3;

DESCRIPTION OF THE PREFERRED EMBODIMENTS

This invention is generally applicable to power-driven devices such as tools, and is particularly applicable to lawn mowers wherein the working element is driven by an electric motor.

A summary of the electric mowers available on the market is contained in the February 1967 issue of the Popular Science magazine at pages 154 to 158. It is noted in this article that, typically, a good electric mower has a universal motor rated at about 1 to 1½ horsepower and that these motors run at about 15,000 rpm. At this speed these motors produce a high-pitched whine which is very objectionable in lawn mowers employed in the more densely populated residential areas. To overcome this high-pitched whine caused by the high speed of the motor, a direct-current motor operating at a safe speed for the particular device is employed in accordance with the present invention with the motor being directly coupled to the working element of the tool such as the cutting blade of a lawn mower.

Figure 1:
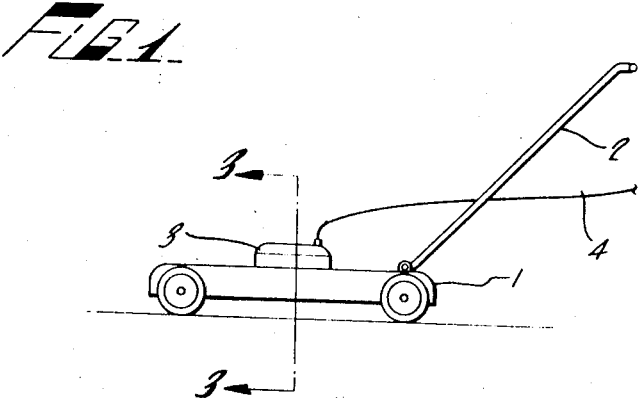
FIG. 1 depicts a side elevation view of a rotary blade lawn mower which is representative of the devices having working elements controlled in accordance with the present invention.

A side elevation view of a lawn mower powered by an electric motor is shown in FIG. 1 of the drawing. The lawn mower has a chassis 1 and a handle 2 for the user of the mower to push the mower over the grass to be cut. The working element of the mower is powered by an electric motor 3 having its power supplied through a cable 4 that is plugged into a voltage source at the other end.

Figure 2:
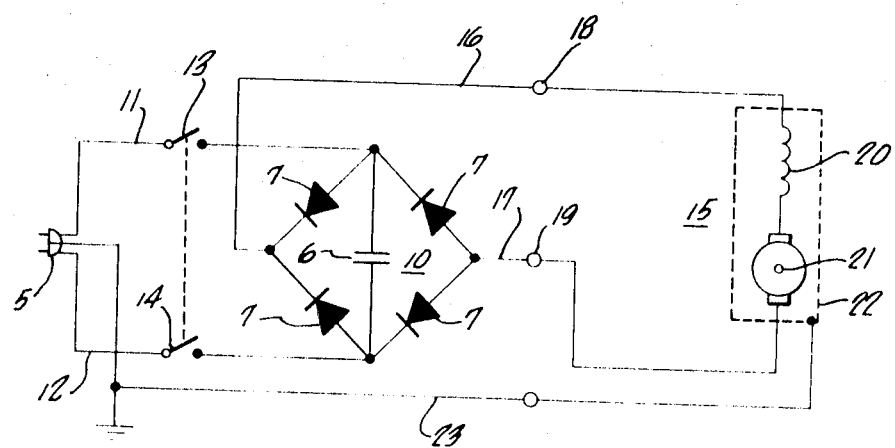
FIG. 2 is a schematic diagram of the electrical connection of the power system for the power-driven devices in accordance with the present invention.

The power source for the working element of the mower shown in FIG. 1 is a direct-current motor that advantageously has a series field to provide the desired torque under load. A schematic diagram of the direct-current motor and its source of power is shown in FIG. 2. The power cable 4 of FIG. 1 is a three-wire cable, two of the wires being the hot wires to supply voltage to the motor through a rectifier circuit 10, shown in FIG. 2. The third wire is provided for safety reasons and is directly attached to the chassis of the lawn mower or the frame of the motor to provide ground connection for the mower. Wires 11 and 12 of the schematic diagram shown in FIG. 2 are the hot wires that carry the alternating current to the rectifier 10 when the plug 5 is inserted in an ordinary alternating-current outlet.

The voltage is applied to rectifier circuit 10 through switches 13 and 14 provided in lines 11 and 12, respectively. Two switches are provided so that the source of electricity is completely disconnected from the motor as a further safety feature. However, a single switch in one line could also be employed.

The alternating-current voltage from the alternating-current outlet coupled to the rectifier 10 through the plug 5 is converted to direct current and applied to the direct-current motor 15 through leads 16 and 17 which are respectively coupled to the input terminals 18 and 19 of the motor. The rectifier circuit 10 includes diodes 7 connected in a full-wave bridge circuit, and a capacitor 6 to filter out the transient voltages on the line carrying the alternating-current to protect the rectifier 10 and the motor 15.

The direct-current motor 15 is advantageously a series-wound motor having a series field winding 20 and an armature 21. The frame of the motor is schematically shown by the dotted line 22 in FIG. 2 and is coupled to ground through lead wire 23.

This series-wound, direct-current motor advantageously produces a 1 horsepower output at speeds less than 4000 rpm as contrasted to the universal alternating-current motors presently employed for lawn mowers which develop one horsepower at a speed of about 15,000 rpm. Thus, it is seen that the direct-current, series-wound motor produces an equivalent output at a lower speed than does the universal alternating-current motor. Consequently, the direct-current motor-powered device does not require the expensive speed-reduction means which require periodic maintenance and replacement. The motor is instead directly coupled to the working element in accordance with the present invention. Such a direct coupling of the direct-current motor to the cutting blade, which is the working element of the lawn mower, is shown in FIG. 3.

The direct-current motor 15 is mounted on the chassis 1 of the mower by brackets 31 and 32. The motor could also be mounted to the chassis 1 in some other suitable manner. This direct-current motor may be a lightweight, flat commutator type as shown in FIG. 3, or it may be any other suitable direct-current motor. For example, the commutator could be cylindrically shaped and attached to the upper part of the shaft 41 to provide a radial commutator. However, the lightweight, compact, flat commutator type of direct-current motor shown in FIG. 3 is readily suited for use with many of the power-driven tools, for example chain saws, where weight and size are significant considerations in the design of the power source for the tool.

The frame or yoke 33 of the motor is connected to the chassis 1 of the lawn mower through the brackets 31 and 32. Positioned around the inside of the yoke are field pole pieces, such as pole shoes 34 and 35, forming the stator of the motor. A field winding 36 is held in place by the individual pole shoes cooperating with the inside surface of the yoke 33.

The upper end bell portion 37 of the stator has an indentation at its center to support a bearing 38 with a cap 39 keeping the bearing 38 free from dust and foreign matter.

The armature 40 is connected to the shaft 41 and causes the shaft to rotate when current flows through the armature windings and the field windings of the motor. The shaft 41 is journaled at the top by bearing 38 and at the bottom by bearing 42 which is held in place by the lower end bell 43 of the motor.

A working element, such as a lawn mower cutting blade 44 is attached to the end of the motor shaft 41 by some suitable means, which is generally shown in FIG. 3 as a nut 45, cooperating with threads on the end of the shaft 41. In this way the working element of the tool is directly coupled to the shaft and armature of the motor.

In addition to the nut 45, there are two washers 46 and 47 located on the shaft, one on top of the working element 44 and the other on the bottom. These washers provide, in a well known manner, for slippage of the working element under a prescribed load which is required for many of the tools, and in particular, lawn mowers.

The speed of the direct-current motor will be determined by the safety requirements prescribed for the particular power-driven tool with which the motor is associated. For example, in the lawn mower field the maximum tip speed of the cutting blade permitted in the industry is now 19,000 feet per minute. For an eighteen inch blade rotating about its midpoint the maximum shaft speed to be within the safety requirements is, therefore, approximately 4030 rpm. Thus, a direct-current motor that will produce one horsepower at this speed or less is well suited to power a lawn mower having an 18-inch rotary blade.

In many power-driven devices there is a requirement that the working element comes to a complete stop within a prescribed time after the removal of energy from the power source driving the working element. For example, in the lawn mower industry there is a requirement that the blade must come to rest within ten seconds after the power is disconnected to shut off. To meet this requirement there is provided in the direct-current motor of FIG. 3 a simple and economical friction braking means that is integral with the direct-current motor. The friction braking means includes a disc 48 that is mechanically coupled to the shaft 41 through a cooling fan 49. In conjunction with the disc 48 there is provided on one or more pole shoes magnetically responsive brake shoes 51 and 52.

The braking means may be seen more easily in FIG. 4 which is a view taken along the section lines 4—4 of the motor shown in FIG. 3 with the front quarter of the motor also shown in FIG. 4 so that approximately one-half of the motor is shown. The brake shoe 52 includes a brake shoe lining 53 mounted on a backing plate 54. Backing plate 54 is hinged from a hinge plate 56 attached to the yoke or frame 33 of the motor. A hinge pin 55 is provided to hold the backing plate 54 in place. Backing plate 54 and hinge plate 56 are made of a ferrous material to provide a flux path through the brake shoe for movement of the brake shoe 52 away from the disc 48 upon energization and operation of the motor.

The mounting of the brake shoe 52 may be seen more easily in FIG. 3 where the brake shoe is shown in cross-section. The backing plate 54 is attached to the hinge plate 56 through the hinge pin 55. The hinge plate 56 is attached to the yoke or frame 33 by some suitable means such as welding or epoxy resin. Alternatively, the hinge plate 56 may be cast as an integral part of the field pole shoe 35.

The backing plate includes an extension 57 that projects down from the plate to the field pole shoe to complete the magnetic circuit and to protect the field winding by keeping the brake shoe away from the winding.

The brake shoe 52 is forced up against the rotating disc 48 by a spring 58 that works against the bottom of the backing plate 54 and the adjacent surface of the frame 33. When there is no current flowing in the field winding 36, the spring will force the backing plate 54 and the attached brake lining 53 upward to engage the rotating disc 48 to stop the rotation of the shaft 41 and thereby, stop the rotation of the directly-coupled lawn mower blade 44. By the action of the friction brake, this working element 44 will come to a complete rest in the required ten seconds after the removal of power and the cessation of current flow through the field winding 36. The time required to stop the rotation of the shaft and the working element may be varied by varying the tension of the spring employed with the brake shoe.

Figure 5:
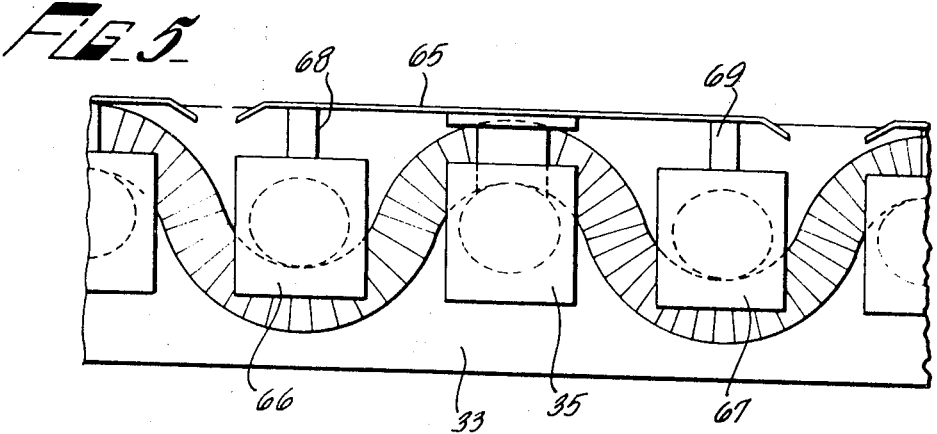
FIG. 5 is a view of the stator of the motor showing an alternative brake shoe for the friction braking means, in accordance with the present invention.

The brake shoes of FIGS. 3 and 4 are positioned over a single field pole shoe. However, for increased braking surface the brake shoe may be hinged at one pole piece and extended over two or more pole pieces. Such a construction is shown in FIG. 5 which is a view of one-half of the frame 33 lying flat.

The brake shoe 65 is hinged on pole shoe 35 similar to the mounting of brake shoe 52 of FIGS. 3 and 4 and extends over adjacent pole shoes 66 and 67. In this way there will be a flux path between adjacent field pole shoes to more positively hold the brake shoe 65 away from the rotating disc when the motor is in operation. At the end of the brake shoe 65 and over the pole shoes 66 and 67 there are stops 68 and 69, respectively, that extend from the bottom of the brake shoe to the top of the field pole shoe so that the field winding will not be interfered with by the brake shoe. The field winding of the direct-current motor shown in FIG. 5 is a serpentine continuous field winding positioned on alternate sides of the pole shoes. However, the friction braking means will also work effectively with field windings that have individual coils positioned around each field shoe.

Figure 8:
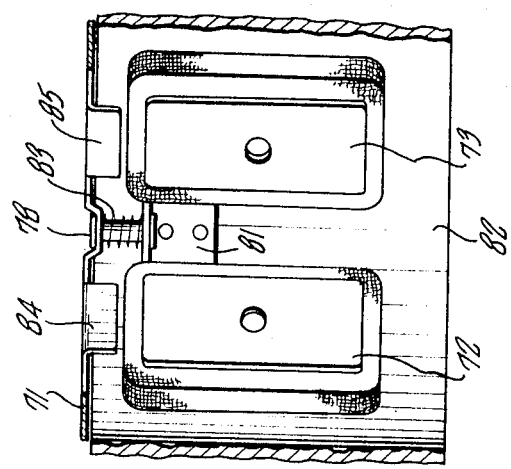
FIG. 8 is an elevation view of the stator and braking element of FIG. 7 taken along the section line 8—8 of FIG. 7.
Figure 7:
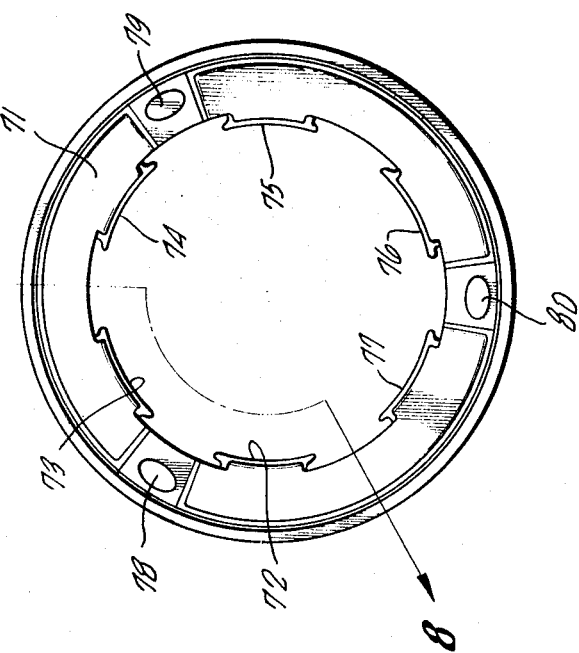
FIG. 7 is a top plan view of a stator housing with an alternative friction braking element comprising a ring extending over all of the field pole shoes.

In place of a plurality of brake shoes, a single ring 71 may be employed as shown in FIGS. 7 and 8, where an alternative friction brake is disclosed. Additionally, the ring may or may not have friction material attached to the surface that cooperates with the disc, such as disc 48 in FIG. 3, associated with the rotor to form the friction brake. Furthermore, the friction material may be alternatively attached to the surface of the cooperating disc, such as disc 48. Ring 71 extends over all of the field pole shoes 72–77 of the stator and is magnetically associated therewith. When the motor is energized the ring 71 moves toward the field pole shoes and away from the cooperating disc, such as disc 48 shown in FIG. 3, to deactivate the brake.

Ring 71 may be advantageously held in place by three lugs 78–80 as shown in FIG. 7. The ring 71 has an indentation for the head of the lug as shown most clearly in FIG. 8 where the mounting of ring 71 by lug 78 is shown. The lug 78 is held in place by a mounting bracket 81, which is attached to the stator frame 82. A spring 83 is positioned between the lower surface of ring 71 and the top of the mounting bracket 81. Spring 83, along with the springs associated with lugs 79 and 80, force ring 71 up against the cooperating disc when power is removed from the motor.

To increase the effectiveness of the disengagement of the brake when the motor is activated and to protect the field windings, tabs, such as tabs 84 and 85, shown in FIG. 8, depend downwardly from the ring 71 to contact the associated field pole shoe, such as shoes 72 and 73, respectively.

Figure 6:
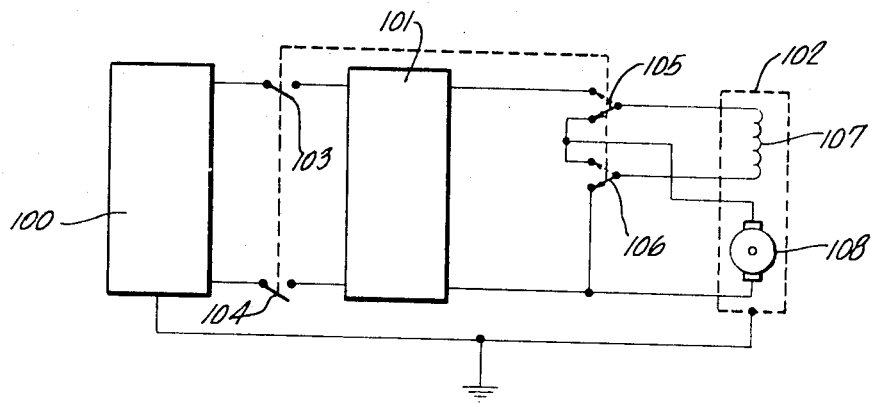
FIG. 6 is a schematic electrical diagram of the dynamic braking means in accordance with the present invention.

An alternative braking means to the braking means of FIGS. 3–5 and 7–8 is shown in FIG. 6. A simple and economical alternative dynamic braking means is provided in accordance with the present invention by employing a switch in conjunction with the "on-off" switch for the direct-current motor which connects the motor as a short-circuited generator which generates a voltage that is applied to the motor in the direction opposite to the voltage applied to operate the device as a motor.

This alternative braking means is shown schematically in FIG. 6 and includes an alternating-current power supply 100, a rectifier 101, and a direct-current motor 102. The power source 100 is connected to the rectifier 101 through switches 103 and 104 which are mechanically coupled to operate together.

The output of the rectifier 101 is applied to the motor through a switch 105 which cooperates with another switch 106 to reverse the field winding 107 and short the motor terminals upon the removal of power to stop the motor. Switches 105 and 106 are coupled to switches 103 and 104 so that they will operate simultaneously therewith.

When the switches 103 and 104 are closed to supply power to the motor, switches 105 and 106 will be transferred to the position shown by the dotted lines. When the switches are in this position the motor is connected as a series-wound motor and voltage from the rectifier 101 is applied to operate the motor. Upon the removal of power by the opening of switches 103 and 104 the switches 105 and 106 will be transferred to the position shown by the solid lines. In this position the field winding of the motor 102 is reversed and the terminals of the motor shorted together. Thereupon, the motor operates as a short-circuited generator supplying a voltage to the field winding in a direction tending to drive the armature 108 in the opposite direction. In this manner, the opposition created will cause the armature to stop its rotation.

The time in which it takes to bring the armature 108 to a complete stop can be varied by varying the amount of current flowing through the field winding 107. The control over the current can be simply accomplished by placing either a variable or a fixed resistor in the current path.

Various changes may be made in the details of construction without departing from the spirit and scope of the invention as defined by the appended claims.

What is claimed is:

1. In a power-driven tool, the combination comprising a working element for the tool; a direct-current motor having a rotor and field pole shoes, with the rotor being directly coupled to the working element; a power source for energizing the motor; means for connecting the power source to the motor; means for selectively interrupting the connection between the power source and the motor to remove energy from the motor; and means for stopping the working element when the energy is removed from the motor, the stopping means including a rotating disc coupled with the rotor, at least one magnetically responsive brake shoe hinged near one of the field pole shoes and extending away from the field pole shoe where it is attached to cover at least one other field pole shoe, the brake shoe being magnetically coupled to the pole shoes during operation of the motor for maintaining the brake shoe out of contact with the disc, and means for spring-loading the brake shoe to cause the brake shoe to engage the disc when the motor is deenergized to form a friction brake.

2. In a power-driven tool, the combination comprising a working element for the tool; a direct-current motor having field pole shoes and a rotor directly coupled to the working element; a power source for energizing the motor; means for connecting the power source to the motor; means for selectively interrupting the connection between the power source and the motor to remove energy from the motor; and means for stopping the working element when the energy is removed from the motor, the stopping means including at least one magnetically responsive brake shoe positioned adjacent to one of the field pole shoes so as to be mounted within the magnetic field developed by energization and operation of the motor, a rotating disc connected with the rotor and extending to a position adjacent to the brake shoe, means for pivotally mounting the brake shoe for movement toward and away from the disc, and biasing means operative in response to deenergization of the motor and the resulting collapsing of the magnetic field for urging the brake shoe into engagement with the disc to brake and stop movement of the working element.

3. In a power-driven tool, the combination comprising a working element for the tool; a direct-current motor having a rotor and field pole shoes and a stator having a field winding magnetically coupled with the field pole shoes, the motor being directly coupled to the working element; a power source for energizing the motor; means for connecting the power source to the motor; means for selectively interrupting the connection between the power source and the motor to remove energy from the motor; and means for stopping the working element when the energy is removed from the motor, the stopping means including a rotating disc coupled with the rotor, a magnetically responsive brake ring extending over the field pole shoes and magnetically coupled to the pole shoes during operation of the motor for maintaining the brake ring out of contact with the disc, the brake ring having tabs extending perpendicularly from the plane of the ring, each tab being associated with and extending toward an individual field pole shoe to enhance the magnetic coupling between the ring and the field pole shoes and to protect the field winding on the field pole shoes, and means responsive to the deenergization of the motor and the resulting collapsing of the magnetic coupling between the brake ring and the field pole shoes to force the brake ring and disc into contact with each other to form a friction brake.

4. In a power-driven tool, the combination comprising a working element for the tool; a direct-current motor having a rotor and a stator including a field winding and field pole shoes, the motor being coupled to the working element; a power source for energizing the motor; means for connecting the power source to the motor; means for selectively interrupting the connection between the power source and the motor to remove energy from the motor; and means for stopping the working element when the energy is removed from the motor, the stopping means including a rotating disc coupled with the rotor and having a surface portion extending to a position adjacent to the field pole shoes, a magnetically responsive brake shoe spaced radially from the rotor, means spaced radially from the rotor for mounting the brake shoe for movement between said surface portion of the disc and at least one of said pole shoes, the brake shoe being magnetically coupled with each pole shoe with respect to which it moves during energization of the motor from the power source for maintaining the brake shoe out of contact with the disc, and means responsive to the deenergization of the motor and the resulting collapsing of the magnetic coupling between the brake shoe and its associated field pole shoe for moving the brake shoe into contact with the disc to form a friction brake.

5. The combination according to claim 4 wherein the brake shoe is pivotally mounted between the disc and its associated pole shoe.

6. The combination according to claim 4 including a plurality of magnetically responsive brake shoes movably mounted at separate points spaced radially from the rotor, each brake shoe being mounted between a respective surface portion of the disc and a respective pole shoe, whereby during deenergization of the motor the brake shoes are moved into contact with the disc at different points on the surface of the disc.

7. The combination according to claim 4 wherein the brake shoe is hinged near its associated pole shoe and extends away from said pole shoe where it is attached to cover at least one other field pole shoe, and means for spring-loading the brake shoe to engage the disc when the motor is deenergized.

8. The combination according to claim 4 wherein the brake shoe comprises a ring having an axis substantially concentric with the rotor so the body of the ring is radially spaced from the rotor, the body of the ring being movable between said surface portion of the disc and the pole shoes.

9. The combination according to claim 4 wherein the power source comprises a plug for coupling to an alternating-current outlet, a rectifier for changing the alternating-current voltage to direct-current voltage, and means for coupling the plug to the rectifier.

10. The combination according to claim 4 wherein the working element is the rotor blade of a lawn mower.

11. The combination according to claim 4 wherein the working element is a saw chain of a chain saw.

12. The combination according to claim 4 wherein the working element is a saw blade of a saw.

13. The combination according to claim 4 wherein the disc is coupled to an extension of the rotor so as to rotate with the rotor outside of but adjacent to the stator.

14. In a power-driven tool, the combination comprising a working element for the tool; a direct-current motor coupled to the element, the motor including a rotor and a stator having a field winding and field pole shoes magnetically coupled with the field winding; a power source for energizing the motor; means for connecting the power source to the motor; means for selectively disconnecting the power source from the motor to remove energy from the motor; and means for stopping movement of the working element when the energy is removed from the motor, the stopping means including a rotating disc coupled with the rotor and extending over the field pole shoes, a magnetically responsive brake ring shoe positioned between the disc and the field pole shoes, the brake ring shoe being concentric with the axis of the rotor and having a body which is spaced radially from the rotor, means spaced radially from the rotor for mounting the brake ring shoe for movement between the disc and the field pole shoes, the brake ring shoe being magnetically coupled to the field pole shoes during energization of the motor from the power source to maintain the brake ring shoe out of contact with the disc, and means operative in response to the disconnecting of the motor from the power source and the resulting loss of magnetic coupling between the brake ring shoe and its associated field pole shoe for urging the brake ring shoe into contact with the disc to brake and stop movement of the working element.

15. In a power driven tool, the combination comprising a working element for the tool; a direct-current motor having a rotor and a stator including a field winding and field pole shoes magnetically coupled with the field winding and spaced radially from the rotor, the motor being coupled to the working element; a power source for energizing the motor; means for connecting the power source to the motor; means for selectively interrupting the connection between the power source and the motor to remove energy from the motor; and means for stopping the working element when the energy is removed from the motor, the stopping means including a rotating disc coupled with the rotor and having a surface portion extending to a position over the end of the field pole shoes, a magnetically responsive brake shoe spaced radially from the rotor and positioned entirely beyond the outer cylindrical boundary of the rotor, means spaced from the rotor for mounting the brake shoe for movement between said surface portion of the disc and pole shoe, the brake shoe being magnetically coupled to said one pole shoes during energization of the motor from the power source for maintaining the brake shoe out of contact with the disc, and means responsive to the deenergization of the motor and the resulting collapsing of the magnetic coupling between the brake shoe and its associated pole shoe for moving the brake shoe into contact with the disc to form a friction brake.

16. The combination according to claim 15 including a plurality of magnetically responsive brake shoes movably mounted at separate points spaced radially from the rotor, each brake shoe being mounted between a respective surface portion of the disc and a respective pole shoe, whereby during deenergization of the motor the brake shoes are moved into contact with the disc at different points on the surface of the disc.

17. In an electric motor having a rotor with a cylindrical outer boundary, a stator with field pole shoes and at least one field winding on the pole shoes, a means for stopping the rotor when the energy is removed from the motor comprising a disc coupled to rotate with the rotor, the disc having a surface portion positioned over the ends of the field pole shoes, a ring shaped element magnetically coupled to the field pole shoes and positioned between the surface portion of the disc and the ends of the field pole shoes and entirely beyond the outer cylindrical boundary of the rotor, means for mounting the element to move axially between the end of the field pole shoes and the disc, with the mounting means being beyond the outer cylindrical boundary of the rotor, and biasing means for urging the element against the disc when the motor is not energized.

18. The stopping means in accordance with claim 17 further including brake lining attached to the surface of either the disc or the element that faces the other member of the stopping means.

19. The stopping means in accordance with claim 17 wherein the element has one or more tabs extending perpendicularly from the plane of the element, each tab being associated with and extending toward an individual field pole shoe to enhance the magnetic coupling between the element and the field pole shoes and to protect the field winding.

* * * * *